United States Patent [19]

Nettleton et al.

[11] Patent Number: 4,807,839

[45] Date of Patent: Feb. 28, 1989

[54] DEFORMABLE WEB OPTICAL MIRROR MOUNT

[75] Inventors: John E. Nettleton; Dallas N. Barr, both of Woodbridge, Va.

[73] Assignee: The United States of America as represented by the Secretary of the Army, Washington, D.C.

[21] Appl. No.: 694,358

[22] Filed: Jan. 24, 1985

[51] Int. Cl.⁴ .............................................. G02B 7/18
[52] U.S. Cl. .................................. 248/476; 350/633; 372/107
[58] Field of Search ..................... 248/474, 476, 479; 350/632, 633, 634; 372/107

[56] References Cited

U.S. PATENT DOCUMENTS

| | | | |
|---|---|---|---|
| 3,428,915 | 2/1969 | Leone | 372/107 |
| 3,696,307 | 10/1972 | Beaulieu | 372/107 |
| 3,751,139 | 8/1973 | Malherbe | 372/107 |
| 3,764,934 | 10/1973 | Schamberger | 372/107 |
| 3,886,474 | 5/1975 | Hensolt | 372/107 |
| 4,149,779 | 4/1979 | Hamerdinger | 372/107 |
| 4,232,275 | 11/1980 | Kolb | 372/107 |

FOREIGN PATENT DOCUMENTS 248284 7/1969 U.S.S.R. .

Primary Examiner—J. Franklin Foss
Assistant Examiner—Robert A. Olson
Attorney, Agent, or Firm—Anthony T. Lane; Milton W. Lee; Aubrey J. Dunn

[57] ABSTRACT

A device for supporting a laser output mirror and allowing easy adjustment of the mirror, including a flexible ring carrying the mirror. The ring is supported by a part secured to the laser housing. The part also carries a plate with adjusting screws therethrough and bearing on the ring, the screws being inclined with respect to the optical axis of the housing. Thus, one is able to adjust the adjusting screws without exposing one's hands to the laser beam.

1 Claim, 1 Drawing Sheet

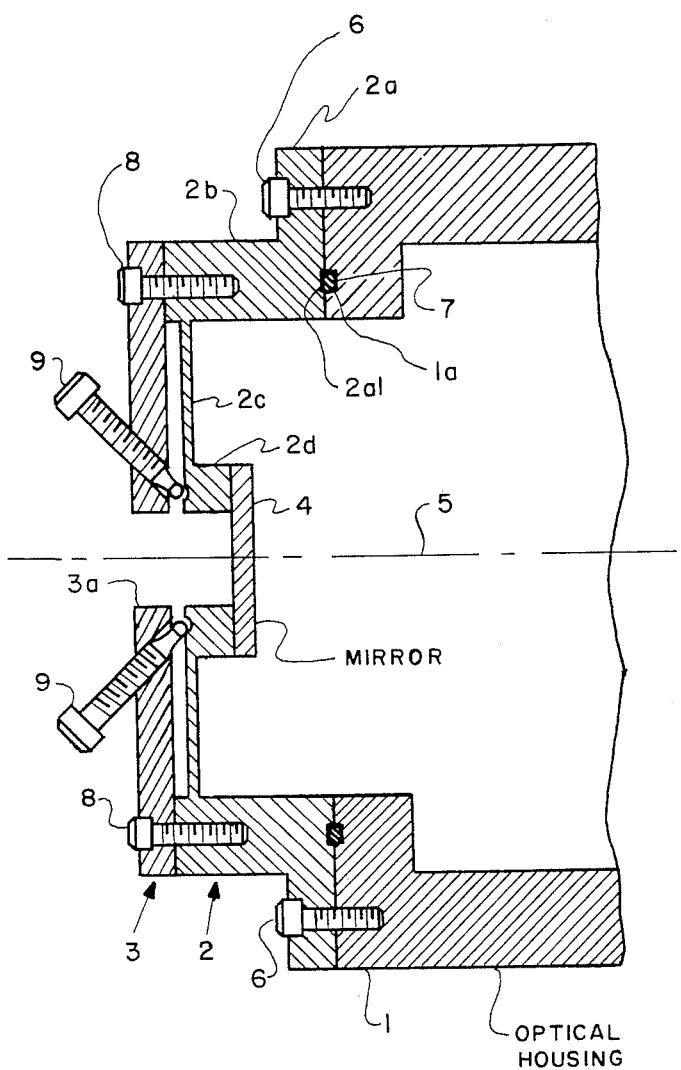

DEFORMABLE WEB OPTICAL MIRROR MOUNT

The invention described herein may be manufactured, used, and licensed by the U.S. Government for governmental purposes without the payment of any royalties thereon.

BACKGROUND OF THE INVENTION

This invention is in the field of optics, and is particularly concerned with an adjustable mounting device for an optical mirror. Various devices are now known and used for adjusting the alignement of a mirror in an optical system. A particular system which requires such alignment is a laser; the adjusting devices currently available for lasers are complex, with a multitude of micrometer steering screws, and with the screw barrels approximately parallel to the laser beam. If these devices are used on the output mirror of a laser, one is faced not only with the problem of deciphering which screw to adjust, but of avoiding laser burns when making adjustments. The present invention avoids these problems and should be very cheap and easy to manufacture.

SUMMARY OF THE INVENTION

A support for an optical mirror is carried by a flexible ring or web carried by a flange, or a boss on a flange. The flange is mounted to an optical housing and the boss or flange supports an adjustment plate with adjusting screws therethrough. These screws are inclined to the axis of the housing and bear on the ring such that the settings of the screws deflect the ring and cause corresponding deflections of the mirror with respect to the optical axis of the housing.

BRIEF DESCRIPTION OF THE DRAWING

The single drawing FIGURES in a side cross-sectional view of the invention.

DETAILED DESCRIPTION OF THE INVENTION

The invention may be best understood when this description is taken in conjunction with the drawing. Referring now to the drawing, reference numeral 1 designates an optical housing to which the invention is mounted. The inventive device consists of two main parts, generally designated 2 and 3. Part 2 is a body of revolution including a flange 2a, a boss 2b, a flexible or deformable web or ring 2c and a stiff ring 2d. A mirror or other optical device 4 is adhesively (or otherwise) attached to ring 2d on the optical axis 5 of optical housing 1. Web or ring portion 2c is thin with respect to the other portions of part 2, and may be deflected as will be explained below. Part 2 is held to housing 1 by set screws 6 or equivalent and has a groove 2a1 to hold 0-ring seal 7, in conjunction with groove 1a of housing 1. Part 3 is secured to part 2 by set screws 8 or equivalent and is a flat plate with adjusting screws 9 extending therethrough and with a central opening 3a. The adjusting screws, which number at least three, but preferably four, are inclined with respect to optical axis 5, and bear against ring portion 2d of part 2. As the screws are adjusted, portion 2c flexes, and optical device 4 deflects with respect to axis 5.

The particular environment for which the invention arose was in medium and high-power lasers. Thus, housing 1 may be an enclosure for a lasing medium, and optical element 4 may be a partially transmitting mirror used as the output mirror of the laser. The laser beam therefore exits through mirror 4 to the left in the drawing, and inclined adjusting screws 9 may be adjusted without exposing the adjusting person's hand to the laser beam, with the consequent danger of laser burns. Parts 2 and 3 may be readily fabricated from mild steel (or other metal) on a lathe, with the various screw holes made on a drill press. Obviously, part 2 could be cast, and part 3 punched.

It can be seen from the drawings and from this description that the inventors have made a device which, while simple in construction fills a real need in the art. One is able to readily adjust a laser output mirror without exposing one's hands to the laser beam, and with a minimum of adjusting screws.

We claim:

1. A device for mounting on a housing and for adjustably holding an optical element with respect to an optical axis in said housing, wherein said device includes: a unitary body of revolution with a flange portion for mounting to said housing, a boss portion extending from said flange portion, and a flexible ring portion within said boss portion for holding said element; and an adjustment plate secured to said boss portion and including at least three adjusting screws bearing on said ring portion, wherein said screws are inclined with respect to said optical axis, and wherein said body is formed of a single piece of solid material.

* * * * *